US010999772B2

(12) United States Patent
Thomas

(10) Patent No.: US 10,999,772 B2
(45) Date of Patent: May 4, 2021

(54) SWITCHOVER FROM A FIRST COMMUNICATION INTERFACE TO A SECOND IN ORDER TO IMPROVE THE PERCEIVED QUALITY OF THE COMMUNICATION

(71) Applicant: Orange, Paris (FR)

(72) Inventor: Jean-Philippe Thomas, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/347,485

(22) PCT Filed: Oct. 11, 2017

(86) PCT No.: PCT/FR2017/052792
§ 371 (c)(1),
(2) Date: May 3, 2019

(87) PCT Pub. No.: WO2018/083391
PCT Pub. Date: May 11, 2018

(65) Prior Publication Data
US 2019/0281519 A1 Sep. 12, 2019

(30) Foreign Application Priority Data

Nov. 4, 2016 (FR) ...................... 1660671

(51) Int. Cl.
*H04L 12/26* (2006.01)
*H04W 36/14* (2009.01)
(Continued)

(52) U.S. Cl.
CPC ........... *H04W 36/14* (2013.01); *G10L 19/005* (2013.01); *H04L 1/0045* (2013.01);
(Continued)

(58) Field of Classification Search
None
See application file for complete search history.

(56) References Cited

U.S. PATENT DOCUMENTS 8,781,475 B1 * 7/2014 McKeeman .......... H04W 36/32
370/331
9,420,510 B1    8/2016 Surmay et al.
(Continued)

FOREIGN PATENT DOCUMENTS

EP          2515498 A1    10/2012
WO     2011046439 A1    4/2011

OTHER PUBLICATIONS

International Preliminary Report on Patentability and English translation of the Written Opinion dated May 7, 2019 for corresponding International Application No. PCT/FR2017/052792, filed Oct. 11, 2017.

(Continued)

*Primary Examiner* — Brandon M Renner
(74) *Attorney, Agent, or Firm* — David D. Brush; Westman, Champlin & Koehler, P.A.

(57) ABSTRACT

A method for switching from a first communication interface to a second communication interface on a terminal in the process of communication. This method includes the following steps: detecting a number of commands to implement a process of replacing missing samples while audio of the communication is being decoded; and switching to a second communication interface when the number of commands exceeds a threshold. Also disclosed are a device and communication terminal implementing the method as described.

9 Claims, 3 Drawing Sheets

(51) Int. Cl.
    *G10L 19/005*     (2013.01)
    *H04L 1/00*     (2006.01)
    *H04L 1/18*     (2006.01)
    *H04W 36/30*     (2009.01)
    *H04W 36/00*     (2009.01)
    *H04W 88/06*     (2009.01)

(52) U.S. Cl.
    CPC ....... *H04L 1/1829* (2013.01); *H04W 36/0079* (2018.08); *H04W 36/30* (2013.01); *H04W 88/06* (2013.01)

(56) References Cited

U.S. PATENT DOCUMENTS

| | | | |
|---|---|---|---|
| 2006/0268848 A1 | 11/2006 | Larsson et al. | |
| 2007/0156972 A1* | 7/2007 | Uehara | G06F 12/0831 711/146 |
| 2008/0089325 A1 | 4/2008 | Sung | |
| 2008/0232299 A1* | 9/2008 | Mosig | H04W 48/18 370/328 |
| 2009/0010222 A1 | 1/2009 | Jechoux | |
| 2009/0060028 A1* | 3/2009 | Liu | H04N 21/472 375/240.01 |
| 2010/0115332 A1* | 5/2010 | Zheng | G06F 11/1466 714/6.2 |
| 2010/0188967 A1* | 7/2010 | Michaelis | H04L 1/22 370/216 |
| 2013/0235731 A1 | 9/2013 | Hadinata et al. | |
| 2014/0105036 A1* | 4/2014 | Anschutz | H04L 65/80 370/252 |
| 2016/0065994 A1* | 3/2016 | Kokaska | H04N 21/2365 375/240.26 |
| 2016/0142317 A1* | 5/2016 | Yang | H04L 47/30 370/429 |
| 2016/0261512 A1* | 9/2016 | Lautenschlaeger | H04L 41/0631 |
| 2017/0090846 A1* | 3/2017 | Verma | G06F 3/1454 |
| 2018/0048578 A1* | 2/2018 | Rollet | H04L 43/028 |

OTHER PUBLICATIONS

International Search Report dated Nov. 29, 2017 for corresponding International Application No. PCT/FR2017/052792, filed Oct. 11, 2017.
Written Opinion of the International Searching Authority dated Nov. 29, 2017 for corresponding International Application No. PCT/FR2017/052792, filed Oct. 11, 2017.

\* cited by examiner

SWITCHOVER FROM A FIRST COMMUNICATION INTERFACE TO A SECOND IN ORDER TO IMPROVE THE PERCEIVED QUALITY OF THE COMMUNICATION

CROSS-REFERENCE TO RELATED APPLICATIONS

This application is a Section 371 National Stage Application of International Application No. PCT/FR2017/052792, filed Oct. 11, 2017, the content of which is incorporated herein by reference in its entirety, and published as WO 2018/083391 on May 11, 2018, not in English.

FIELD OF THE DISCLOSURE

The present invention pertains to the general field of telecommunications. It relates more particularly to managing the switchover, by a terminal that is currently communicating, between a plurality of communication interfaces of a telecommunications network.

BACKGROUND OF THE DISCLOSURE

The communication network makes it possible for example to access telephony or video telephony services on a mobile network.

Telephony and video telephony services on 2G and 3G mobile networks use "circuit-switched" technology, called CS (circuit switching).

For the last few years, with the advent of 4G mobile networks, operators have begun to deploy IMS (for "IP multimedia subsystem") architectures, making it possible to provide their clients with VoLTE/ViLTE (VxLTE for "Voice services over Long Term Evolution") services, that is to say voice and video telephony services using IP technology.

Moreover, to cover lack of 2G, 3G or 4G radio coverage, operators have decided to offer their clients VoWiFi/ViWiFi (VxWiFi) services, that is to say voice and video telephony services that also use an IMS architecture, but whose voice transport is performed over Wi-Fi radio technology.

VxLTE and VxWifi services both use "packet-switched" technology, called PS, and the same IMS core network.

Voice communication may be established indiscriminately by way of a Wi-Fi, 4G or 2G/3G access network.

Wi-Fi technology is not optimal for voice transport. In the event of strong constraints or demands on the Wi-Fi radio, attempts to prioritize voice over other data do not make it possible to keep good quality of the voice signal.

The Wi-Fi radio link may be shared by several active access points in one and the same geographical area, which may deteriorate the quality of the transported voice. Likewise, for one and the same Wi-Fi access point, the radio frequency band may be shared between several appliances connected to this point and, depending on the traffic caused by these appliances, the quality of the transported voice may be degraded. In addition, as Wi-Fi coverage is limited in terms of distance, the quality of the communication may also be degraded upon moving away from the Wi-Fi access point. Interference may also be caused by nearby appliances implementing other radio technologies using the same frequencies, such as for example Bluetooth and NFC technologies. Some household appliances, such as microwaves, may also generate interference by using frequencies common to the Wi-Fi radio.

To rectify this problem of quality of voice over Wi-Fi, there are mechanisms for switching over between a Wi-Fi network and a 4G network that are based on analyzing the level of the radio signal or else on the loss of Wi-Fi packets. Some terminal manufacturers completely prohibit the use of voice over Wi-Fi (VoWiFi) on certain access points that are deemed to be incompatible.

For example, published patent application US20090010222 describes a method for switching over from one network to another on the basis of the RSSI (for "received signal strength indication") level, measuring the strength of the Wi-Fi signal.

This mechanism along with other mechanisms from the prior art are based on analyzing the Wi-Fi network, and do not take into account the quality actually perceived by the user. Now, the correlation between the quality of the Wi-Fi network and the quality actually perceived by the user is not direct.

There is therefore a need for a solution for taking into account the quality of the communication perceived by a user in order to switch over from one communication network to another, or more generally from one communication interface to another.

SUMMARY

The present invention aims to improve the situation.

To this end, it proposes a method for switching over from a first communication interface to a second communication interface on a terminal that is currently communicating. The method is such that it includes the following steps:
  detecting a number of commands to implement a process for replacing missing samples during the audio decoding of the ongoing communication;
  switching over to a second communication interface when the number of commands exceeds a threshold.

Detecting the number of commands to implement a process for replacing missing samples makes it possible to detect interference on the received audio signal without having to measure the characteristics of the communication interface via which the received signal has transited and without knowing the origin of the interference.

This detection is easy to implement and makes it possible to measure, as close as possible to the rendering of the audio signal to the user, whether the quality of the signal is sufficient on the communication interface that is used.

The various particular embodiments mentioned hereinafter may be added independently or in combination with one another to the steps of the switchover method defined above.

In one particular embodiment, the threshold is defined by a maximum consecutive number of commands.

The interference leading to a series of missing frames (or "burst") is thus detected, and indicates a loss of quality on the rendered audio signal. Reaching such a threshold makes it possible to switch over to another network, which will not cause the same interference.

In another embodiment, the threshold is defined by a maximum number of commands in a limited time.

Reaching such a threshold indicates that the received audio signal is subject to strong interference over a short period of time, and that switching over to another communication network will make it possible to avoid this type of interference.

In some possible exemplary embodiments, the switchover is performed between two communication interfaces from among the communication interfaces in the following list:
  Wi-Fi on a first Wi-Fi access point and at a first frequency;

Wi-Fi on a first Wi-Fi access point and at a second frequency;
Wi-Fi on a second Wi-Fi access point and at a first frequency;
Wi-Fi on a second Wi-Fi access point and at a second frequency;
4G on a first 4G antenna and at a first frequency;
4G on a first 4G antenna and at a second frequency;
4G on a second 4G antenna and at a first frequency;
4G on a second 4G antenna and at a second frequency;
3G;
2G.

In one particular embodiment, the switchover is performed in a predefined order.

Thus, if a first interface switchover is not enough to solve the audio signal quality problem and the number of commands to implement the replacement process is still high, then a second switchover may be implemented. An ordered list of the possible switchovers may be defined by the manufacturers, operators or users of the terminal.

In one variant embodiment, the detection step is performed predictively using statistical analysis of the decoded data flow, of the ongoing communication, from a space for the temporary storage of decoded data of the terminal.

Thus, on the basis of a log of switchovers performed according to the number of commands to implement the replacement process and the data flow from a space for the temporary storage of decoded audio data of the terminal, analyzing the data flow makes it possible to predict the number of commands of the replacement process and thus to anticipate the switchover from one interface to another.

The degradation in quality has therefore not had time to be rendered to the user of the terminal, who will have changed communication interface before the loss of quality.

The present invention also targets a communication device able to implement a switchover from a first communication interface to a second communication interface, the device that is currently communicating being such that it includes:
  a module for detecting a number of commands to implement a process for replacing missing samples during the audio decoding of the ongoing communication;
  a control module for switching over to a second communication interface when the number of commands exceeds a threshold.

The invention also targets a communication terminal including a device such as described above.

This device and this terminal have the same advantages as the method described above that they implement.

The invention targets a computer program including code instructions for implementing the steps of the switchover method as described when these instructions are executed by a processor.

The invention relates lastly to a storage medium, able to be read by a processor, integrated or not integrated into the communication device, possibly removable, on which there is recorded a computer program comprising instructions for executing the steps of the switchover method as described above.

BRIEF DESCRIPTION OF THE DRAWINGS

Other features and advantages of the invention will become more clearly apparent on reading the following description, given purely by way of nonlimiting example and with reference to the appended drawings, in which.

DETAILED DESCRIPTION OF ILLUSTRATIVE EMBODIMENTS

Figure 1:
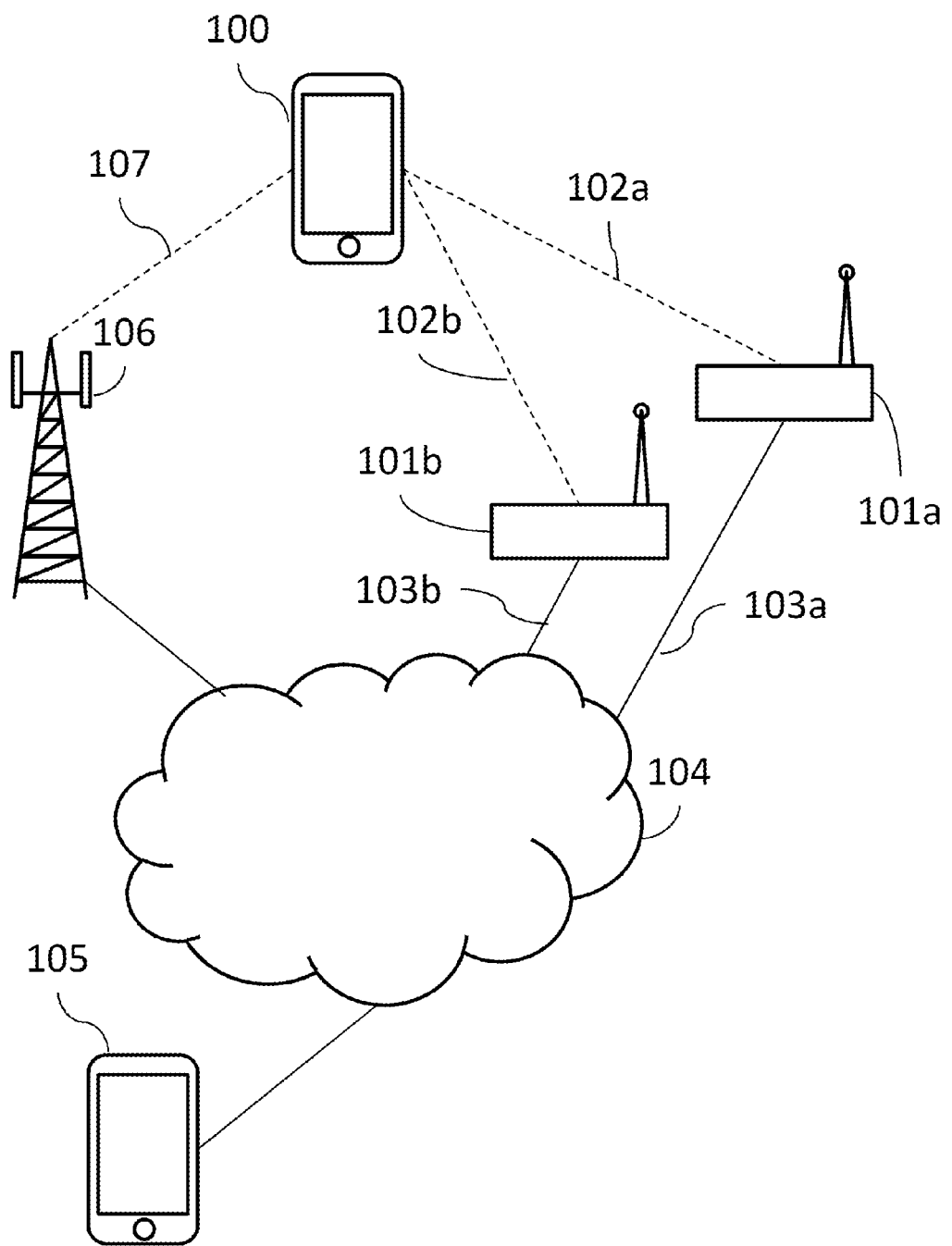
FIG. 1 illustrates a communication system including a plurality of communication interfaces and designed to implement the switchover method according to one embodiment of the invention.

FIG. 1 illustrates an architecture designed to implement a switchover method according to one embodiment of the invention. It shows a terminal 100 connected to a network access point 101a by way of a wireless link 102a. The terminal 100 is a "smartphone" communication terminal that has at least two communication interfaces allowing it to connect to a communication network 104 in various ways.

A first communication interface of the terminal 100 is for example a Wi-Fi network interface designed to connect the terminal to the access point 101a. Such an access point is for example an ADSL (asymmetric digital subscriber line) router modem, offering a Wi-Fi wireless communication interface 102a that is able to operate at different frequencies, for example at a first frequency F1=2.4 GHz or at a second frequency F2=5 GHz. The access point 101a also comprises a second communication interface 103a, for example an ADSL interface, to a communication network 104.

Another access point 101b may also coexist in the same geographical area as the access point 101a. This access point also offers a Wi-Fi communication interface 102b that is also able to operate at different frequencies, for example F1 or F2.

The access point 101b also comprises a second communication interface 103b, for example an ADSL interface, to a communication network 104.

The network 104 is an IMS network, for example. The terminal 100 may thus establish communication with a second terminal 105 by way of a Wi-Fi connection 102a or 102b of the router modems 101a or 101b, of the ADSL network 103a or 103b and of the communication network 104. Such communication established by way of the Wi-Fi access network is VoWifi communication.

The terminal 100 also has a second communication interface. This interface is designed to connect the terminal to the communication network 104 by way of a second access network 106. The access network 106 is for example a 2G, 3G or 4G cellular network. The terminal is thus able to establish communication with the terminal 105 through a connection 107 to the cellular network 106 and the communication network 104. Such communication may be VoLTE communication established over the 4G cellular access network, the network 104 then being an IMS network.

The network for accessing the cellular network is formed by way of an antenna (or eNode), represented here at 106. A plurality of antennas may be available for the terminal, thereby allowing it to switch over communication interface by switching over from one antenna to another.

The communication may also be performed by way of a 2G or 3G cellular access network, the network 104 then being a circuit-switched network.

The terminal 100 is thus able to communicate with the terminal 105 via various access points and using various communication interfaces that it has, and as described above.

As is conventional, the communication interface to be used for establishing communication on the terminal 100 may depend on preferences that are configured beforehand by the telecommunications operator or by the user of the terminal. For example, the terminal may be configured so as to give priority, when possible, to VoWifi communications, for the purpose of reducing costs and lightening the traffic on the cellular network.

This default choice, over the course of the communication, may prove to be unsatisfactory from the point of view of the user, because his audio perception of the communication is not of good quality.

According to one embodiment of the invention, the terminal 100 thus implements a communication interface switchover method according to the steps described with reference to FIG. 2. This switchover is based on counting requests to implement a process for generating missing samples during the decoding of the ongoing communication.

Figure 2:
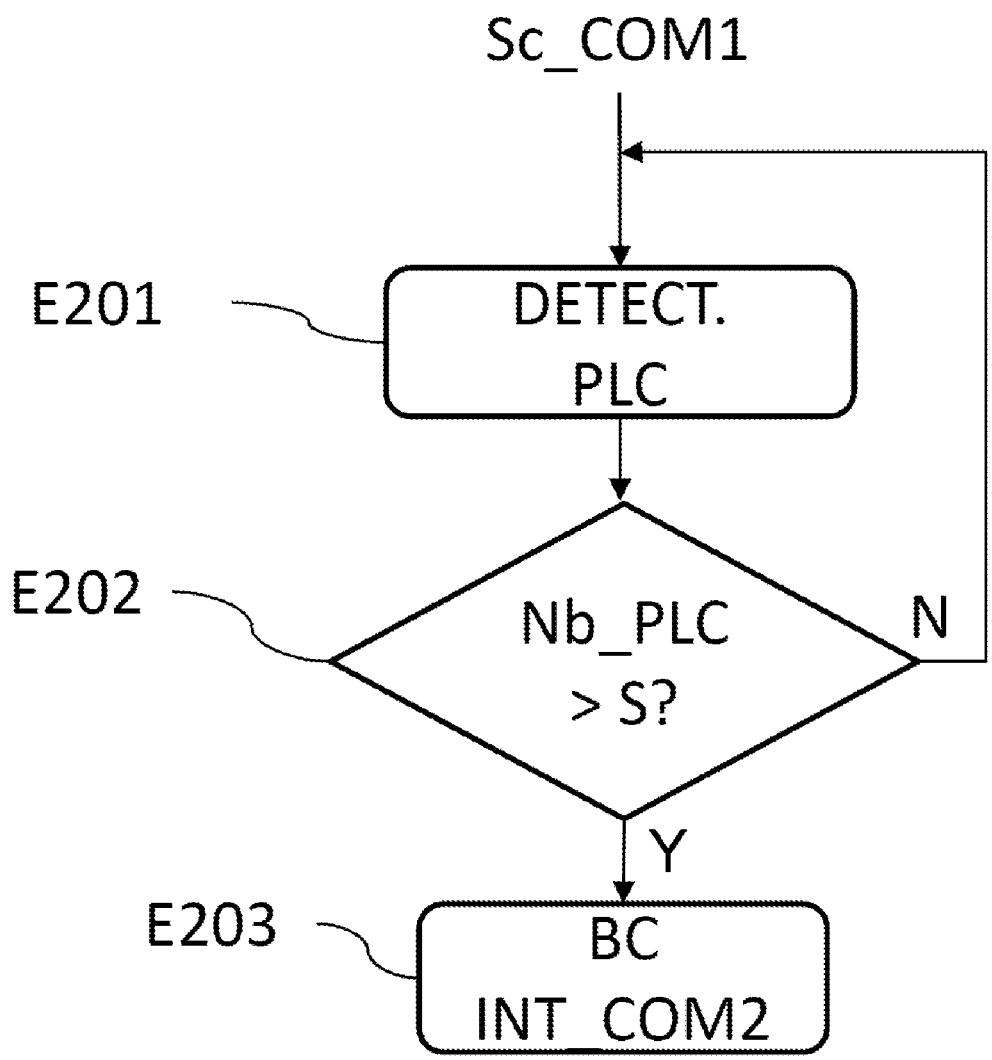
FIG. 2 illustrates the main steps of the switchover method according to one embodiment of the invention.

FIG. 2 thus illustrates the main steps of the switchover method according to one embodiment of the invention.

In step E201, the compressed or encoded audio signal of the ongoing communication between the terminal 100 and the terminal 105, as illustrated in FIG. 1, is received at the audio decoder of the terminal 100 so as to be decompressed or decoded. This decoder includes a module for detecting lack of data in a memory for receiving the compressed data in the data flow to be decompressed, so as to provide a continuous decoded data flow to be rendered to the user.

When the detection module detects a lack of signal, it transmits a missing signal generation request or command to a replacement module that is able to implement a process for generating missing samples (PLC for "packet loss concealment").

In step E202, the number of commands thus sent to the PLC module is counted until this number reaches a threshold S. This threshold is defined for example by a maximum number of successive commands.

This threshold may be between 8 and 12, for example 10. Obviously, this number is not limiting, and it may be different depending on the quality tolerance that it is desired to achieve for the end user.

In another example, the threshold may be defined by a maximum number of commands in a limited time, for example in one second. In one exemplary embodiment, this number may be set to 20 for a duration of one second.

Obviously, these thresholds may have other values depending on the degradation tolerance that the user is able to support.

When the number of commands exceeds the threshold thus defined in step E202 (Y at 202), then step E203 is implemented by switching over from one communication interface to another.

This switchover may be performed for example from the Wi-Fi communication interface to a 4G, or else 2G or 3G, communication interface.

It may be performed by changing from one frequency to another on one and the same Wi-Fi access point.

It may also be performed between two Wi-Fi access points at the same frequency or at different frequencies that are within the same geographical Wi-Fi reception perimeter of the terminal.

The switchover may also be performed from a 4G communication interface to a Wi-Fi communication interface.

Finally, the switchover may also be performed between various radio antennas of the 4G or Wi-Fi communication interface.

This method therefore makes it possible to take into account the audio quality actually perceived by the user, since said user perceives the audio features of a high consecutive number of signal loss corrections or else significant corrections in a limited time.

The command to generate replacement samples is not just due to a Wi-Fi or 4G radio network fault; it may be due to many other problems. These may be latency problems in the arrival of the compressed data packets, problems with the network, but also problems on the terminal or any other problem arising in the transmission chain of the audio part of the communication.

The terminal may for example use the same processor as the one used for VoWifi, but for other functions (for example a data transfer to a computer via a USB interface). The quality of the voice of the VoWifi communication may be impacted by this shared use of the processor. Switching over to another communication interface that is not using the same processor will make it possible to avoid this type of interference on the quality of the communication.

Regardless of the problem in this transmission chain, a high number of calls to the PLC is a sign of degradation of the quality of the audio rendering to the user. This degradation in the quality is directly perceived by the user.

Changing communication interface may then solve this problem, as the transmission chain is changed. This switchover may not provide the quality sufficient for the ongoing communication either. Another switchover may then be provided, until the number of calls to the PLC is below the set threshold.

In one embodiment of the invention, a switchover order may be configured beforehand, either by the operator or by the manufacturer of the terminal or by the user of the terminal. A default order may thus be recorded in memory.

By way of illustration, this order may be as follows, starting from an ongoing communication on a Wi-Fi access point:

Change frequency on the same Wi-Fi access point;
Change Wi-Fi access point at the same frequency;
Change Wi-Fi access point at another frequency;
Change to a 4G (LTE) communication interface;
Change to a 3G communication interface;
Change to a 2G communication interface.

Obviously, this order may be different and may include other cases of use.

In one variant embodiment, step E201 of detecting the number of commands to implement the PLC is performed predictively. A statistical analysis of the fill rate and of the recovery rate of the decoded data of the ongoing communication, from a memory for the temporary storage of the decoded data, is implemented. This analysis makes it possible to predict in advance that the PLC process will be called upon. The analysis may thus be based on log data that are recorded in memory and that give a correlation between the call to the PLC or the number of calls to the PLC and the fill and recovery characteristics of the audio data to be rendered, from a temporary storage module.

This predictive detection then makes it possible to switch over from one interface to another before the audio quality problems are audible to the user.

Figure 3:
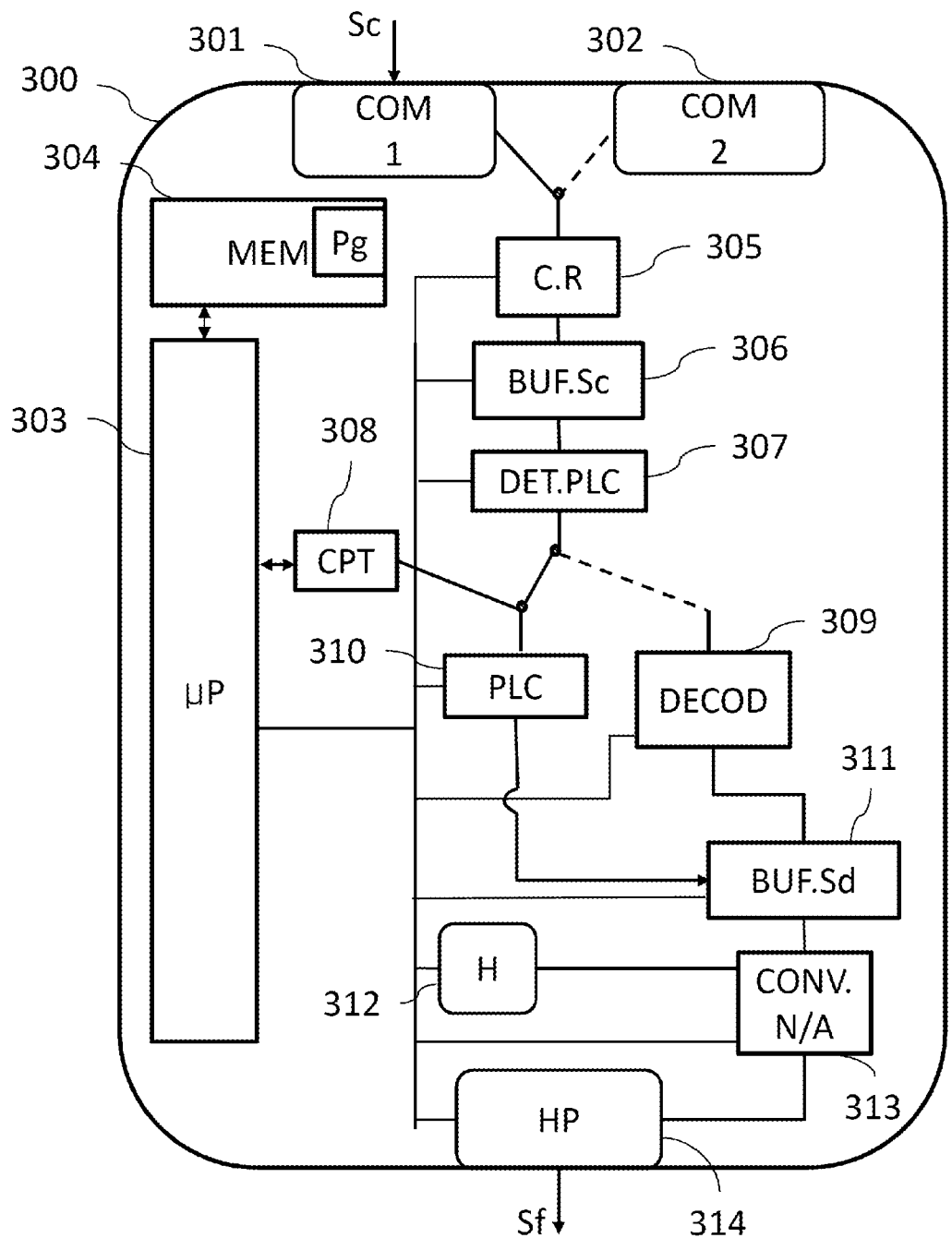
FIG. 3 illustrates a hardware representation of a switchover device designed to implement the switchover method according to one embodiment of the invention.

FIG. 3 illustrates a simplified structure of a switchover device 300 able to implement the switchover method described above with reference to FIG. 2. This switchover device is for example a telephone, a smartphone, a tablet, a connected object or any communication terminal.

It will be noted that the invention that is described here may be implemented by way of software and/or hardware components. In this context, the terms "module" or "entity" used in this document may correspond either to a software component or to a hardware component, or else to a set of hardware and/or software components, capable of implementing the function or functions described for the module or entity in question.

This device includes a processing unit 303 equipped with one or more processors and driven by a computer program Pg stored in a memory 304 and implementing the switchover method as described with reference to FIG. 2.

On initialization, the code instructions of the computer program Pg are for example loaded into a RAM memory, not shown, and executed by a processor of the processing unit 303. This processor of the processing unit 303 implements the steps of the switchover method as described above, and in particular the steps of detecting a number of commands to implement a process for replacing missing samples during the audio decoding of the ongoing communication and of switching over to a second communication interface when the number of commands exceeds a threshold, in accordance with the instructions of the computer program Pg.

In the exemplary embodiment of the invention under consideration, the device 300 includes a first communication interface 301, such as a wireless network interface (COM1), for connecting to and exchanging data by way of a Wi-Fi access network. The communication interface 301 makes it possible to establish communications with another terminal. This communication interface may for example be chosen by default on initialization of the communication if a Wi-Fi access point is close to the device.

The device 300 also includes a second communication interface 302, such as for example a cellular network interface (COM2), designed to establish communications through a 2G, 3G or 4G cellular access network.

The device also has a network card 305 that makes it possible to select, inter alia, the communication interface to be implemented, on initialization of the communication and also during communication and in accordance with the switchover method implemented in the device.

The communication device 300 has a chain for processing the speech signal or more generally the received audio signal encoded for example by the communication interface 301. The decoding part of this received audio signal and the related processing chain are what is of interest here. Of course, the device 300, as communication terminal, also has a chain for encoding the audio signal. This encoding chain is not shown here.

The device 300 includes a speaker 314, which represents the end of the chain for processing the received encoded signal. In order for the user of the terminal 300 to perceive an acceptable quality of the communication signal, the speaker should continuously broadcast a natural speech signal Sf, the speech of the remote speaking party. If there is a break in the continuous flow of the voice, the user will perceive a robotic or slightly intermittent voice, or even a loss of words in the event of a large break.

The speaker is supplied continuously by the digital-to-analog converter 313, which is itself driven by a clock (H) 312 of the terminal. It is this clock that determines the quality of the continuous flow rendered to the user, broadcast continuously by the speaker. Each time the clock 312 is called upon, the digital-to-analog converter 313 recovers a digital data item in the temporary storage module 311 (or "buffer") for storing the decoded voice signal, so as to convert it into an analog signal to be broadcast over the speaker. As long as there are usable data to be recovered in the buffer 311, the user perceives the signal at the output of the speaker with good quality.

The data in the buffer 311 are received from the audio decoder 309 or else from the missing frame replacement module 310.

The encoded, that is to say compressed, signal received by a communication interface 301 or 302 is temporarily stored in the module 306 serving as a "buffer" in the compressed domain.

In the event of interference on the Wi-Fi network (if the communication interface that is used is the Wi-Fi network interface), for example upon the loss of packets or else a packet delay, the buffer 306 no longer contains usable data as needed. This therefore leads to a break in the audio data to be decoded and, at the end of the chain, in the continuous flow of speech to be rendered to the speaker.

To rectify these potential signal breaks, communications terminals use mechanisms for replacing missing, deleted or erroneous frames. These mechanisms are provided in audio decoders responsible for decompressing the received encoded audio signal. For example, speech decoders standardized by the 3GGP standardization body, of AMR or AMR-WB type, or more recently of EVS type, use these missing frame replacement mechanisms, called PLC (for "packet loss concealment"). This mechanism thus makes it possible to generate false audio data in order to mitigate the lack of signal. These false audio data are an estimation of what the true audio signal could be.

If this mechanism is called upon several times in a row, the estimation of the true audio signal is of lower quality, as this mechanism generally has a degenerative memory effect.

A control module 307 for implementing the PLC process detects whether the decoding module 309 is able to recover data to be decompressed in the temporary storage module 306 or "buffer" containing compressed data, that is to say the encoded audio signal. If there are no data in this buffer due for example to Wi-Fi interference, then the control module 307 calls upon the missing sample replacement mechanism 310, which generates the missing samples or frames so that it, rather than the decoder, supplies the temporary storage module 311 with compressed data.

These decompressed data or decompressed false data are then supplied to the digital-to-analog converter 313, which converts the decompressed data into a signal to be broadcast over the speaker 314 in accordance with the rate set by the clock 312.

According to the invention, the device 300 includes a counter 308 for counting requests to implement the missing frame replacement mechanism (PLC).

Thus, each time the PLC module 310 is called upon by the detection module 307, the counter is incremented.

In one particular embodiment, if the number of times that the module 310 is successively called upon exceeds a threshold, this means that the quality of the signal to be rendered by the speaker is of poor quality, and that the communication interface that is used is generating problems, regardless of the problem. The processing unit 303 then commands the communication interface switchover on the network card 305 so as to change from the first communication interface to a second communication interface.

As described with reference to FIG. 2, this threshold may be between 8 and 12, for example 10. Obviously, this number is not limiting, and it may be different depending on the quality tolerance that it is desired to achieve for the end user.

If the first communication interface is a Wi-Fi network interface, the second interface may be the same Wi-Fi network interface, but at a different frequency. It may be another Wi-Fi network interface, on another access point in the same geographical area, at the same frequency or at a different frequency. The second communication interface may be a circuit-switched cellular network interface, that is to say 2G or 3G, or else a packet-switched cellular network interface (LTE), that is to say 4G.

The switchover may also be performed in the other direction, that is to say from a cellular network to a Wi-Fi network.

In one possible embodiment, the switchover may also be performed between a radio antenna (eNode) of an LTE communication to another LTE radio antenna.

In another embodiment, this switchover is performed when the number of requests to implement the missing frame replacement mechanism exceeds a threshold for a limited time.

For example, this threshold could be set to 20 for a limited time of one second.

Obviously, this is just one numerical example, which may vary depending on the tolerance that the user wishes to have with regard to the quality of the received signal.

The communication terminal shown here at 300 thus makes it possible to easily detect the quality of the signal perceived by the end user, that is to say of the signal at the output of the speaker. This detection of a call to the PLC indicates that interference has occurred, either in the network that is used or upon reception of the encoded signal, and that the encoded signal is not received in its entirety, which may lead to a loss of quality.

This detection makes it possible to measure the quality perceived by the end user, since it is performed as close as possible to the user and not in the network, as in the methods from the prior art. It makes it possible to overcome the problem that generated the interference in the signal. Regardless of the cause of the problem, calling upon the PLC is enough to indicate that a problem has occurred and that changing communication interface may make it possible to improve the quality of the received signal.

The invention thus applies to any communication device using an audio decoder in which a missing frame or sample replacement mechanism is provided. The device that is described includes two communication interfaces, but it may include more than two. The switchover may be performed between several communication interfaces, and not just between two interfaces.

If the perceived quality, not the measurement of the number of calls to the PLC, is still not sufficient upon a first switchover, another switchover may be performed or else a return to the initial communication interface may also be performed.

A defined switchover order may be recorded in memory and driven by the processing unit. This defined order may for example be the one listed with reference to FIG. 2.

Lastly, in one particular embodiment, analyzing the fill and recovery rate of the data from the buffer 311 is performed so as to predict in advance that the PLC module will be called upon. The analysis may be based on statistical data calculated using a data log of characteristics of the buffer 311 and of the number of calls to the PLC. This analysis makes it possible to predict and to detect in advance the number of commands to implement the PLC, and thus to switch over the communication interface in advance.

Although the present disclosure has been described with reference to one or more examples, workers skilled in the art will recognize that changes may be made in form and detail without departing from the scope of the disclosure and/or the appended claims.

The invention claimed is:

1. A method for switching over from a first communication interface to a second communication interface on a terminal that is currently communicating, referred to as an ongoing communication, wherein the method comprises the following acts performed by the terminal:
   in case of detecting a lack of data to be decoded in a buffer containing coded data, in an internal chain for processing audio decoding of the ongoing communication, sending a command to implement a process for replacing missing samples;
   detecting a number of commands to implement the process for replacing missing samples; and
   switching over from the first communication interface to the second communication interface when the number of commands exceeds a threshold.

2. The method as claimed in claim 1, wherein the threshold is defined by a maximum consecutive number of commands.

3. The method as claimed in claim 1, wherein the threshold is defined by a maximum number of commands in a limited time.

4. The method as claimed in claim 1, wherein the switchover is performed between two communication interfaces from among the communication interfaces in the following list:
   Wi-Fi on a first Wi-Fi access point and at a first frequency;
   Wi-Fi on the first Wi-Fi access point and at a second frequency, different than the first frequency;
   Wi-Fi on a second Wi-Fi access point and at the first frequency;
   Wi-Fi on the second Wi-Fi access point and at the second frequency;
   4G on a first 4G antenna and at a third frequency;
   4G on the first 4G antenna and at a fourth frequency, different than the third frequency;
   4G on a second 4G antenna and at the third frequency;
   4G on a second 4G antenna and at the fourth frequency;
   3G;
   2G.

5. The method as claimed in claim 1, wherein the detecting is performed predictively using statistical analysis of decoded data flow, of the ongoing communication, from a space for temporary storage of decoded data of the terminal.

6. The method as claimed in claim 1, wherein the switchover is performed in a predefined order.

7. A communication device able to implement a switchover from a first communication interface to a second communication interface, the communication device comprising:
   a processor; and
   a non-transitory computer-readable medium comprising instructions stored thereon, which when executed by the processor configure the communication device to perform a processing chain internal to the communication device for processing audio decoding during an ongoing communication and to perform the following acts in this processing chain;
   in case of detecting a lack of data to be decoded in a buffer containing coded data, sending a command to implement a process for replacing missing samples, in the internal chain for processing audio decoding on the ongoing communication;

detecting a number of commands to implement the process for replacing missing samples; and switching over from the first communication interface to the second communication interface when the number of commands exceeds a threshold.

8. The communication device of claim 7, wherein the communication device is a communication terminal, which comprises:

the first communication interface; and the second communication interface.

9. A non-transitory storage medium able to be read by a processor and on which there is recorded a computer program comprising instructions for executing a method of switching over from a first communication interface to a second communication interface on a terminal that is currently communicating, referred to as an ongoing communication, when the instructions are executed by a processor of the terminal, wherein the method comprises the following acts performed by the terminal:

in case of detecting a lack of data to be decoded in a buffer containing coded data, in an internal chain for processing audio decoding of the ongoing communication, sending a command to implement a process for replacing missing samples;

detecting a number of commands to implement the process for replacing missing samples; and switching over from the first communication interface to the second communication interface when the number of commands exceeds a threshold.

* * * * *